United States Patent
Heary et al.

(10) Patent No.: US 11,373,767 B2
(45) Date of Patent: Jun. 28, 2022

(54) NEUTRON EMITTER FOR A NUCLEAR-FUEL REACTOR

(71) Applicant: Cosmic Energy Power Inc., Springville, NY (US)

(72) Inventors: William E. Heary, Union Springs, NY (US); Frederick M. Heary, Springville, NY (US)

(73) Assignee: Cosmic Energy Power, Inc., Springville, NY (US)

( * ) Notice: Subject to any disclaimer, the term of this patent is extended or adjusted under 35 U.S.C. 154(b) by 208 days.

(21) Appl. No.: 16/889,008

(22) Filed: Jun. 1, 2020

(65) Prior Publication Data

US 2021/0378083 A1    Dec. 2, 2021

(51) Int. Cl.
*G21C 7/34*    (2006.01)
*H05H 3/06*    (2006.01)

(52) U.S. Cl.
CPC ............ *G21C 7/34* (2013.01); *H05H 3/06* (2013.01)

(58) Field of Classification Search
CPC ... G21C 7/00; G21C 7/36; G21C 7/34; G21C 3/54; G21C 3/24; G21C 3/28; G21C 3/26; G21C 3/52; G21C 3/44; G21C 3/42; G21C 1/22; G21C 19/31; G21C 19/30; G21C 19/307; G21C 19/28; G21C 19/42; G21G 4/02; H05H 3/06; H05H 6/00; Y02E 30/30; Y02E 30/00
USPC ................. 376/322, 213, 223, 244
See application file for complete search history.

(56) References Cited

U.S. PATENT DOCUMENTS

| | | | |
|---|---|---|---|
| 619,025 A | 2/1899 | Sims | |
| 2,397,572 A | 4/1946 | Weaver | |
| 2,831,806 A | 4/1958 | Wigner | |
| 2,952,600 A | 9/1960 | Newson | |
| 3,261,755 A | 7/1966 | Mostert | |
| 3,429,203 A * | 2/1969 | Bass | G21C 7/12 74/822 |
| 3,576,103 A | 4/1971 | Kahn | |
| 3,957,575 A | 5/1976 | Fauth et al. | |
| 4,666,658 A | 5/1987 | Meuschke | |
| 4,876,057 A | 10/1989 | Bernard et al. | |
| 5,774,514 A * | 6/1998 | Rubbia | G21C 1/00 376/193 |
| 9,355,748 B2 * | 5/2016 | Bunce | G21C 7/16 |

(Continued)

OTHER PUBLICATIONS

"Thorium". (2018). World Nuclear Association website. URL: https://world-nuclear.org/information-library/current-and-future-generation/thorium.aspx, downloaded on Dec. 22, 2018 (Year: 2018).*

(Continued)

*Primary Examiner* — Darlene M Ritchie
(74) *Attorney, Agent, or Firm* — Pablo Meles; GrayRobinson, PA

(57) ABSTRACT

A breech-loading neutron gun providing neutrons to stimulate the release of energy from nuclear materials in a containment vessel in a regulated fashion includes a chamber among a plurality of chambers located in a breech where one or more of the plurality of chambers are configured and arranged to load with a neutron source, and a mechanism for controllably moving the breech or the chamber relative to an access cavity of the containment vessel and exposing the nuclear materials to neutrons from the chamber when the chamber containing the neutron source aligns with the access cavity.

20 Claims, 4 Drawing Sheets

(56) References Cited

U.S. PATENT DOCUMENTS

| | | | |
|---|---|---|---|
| 11,031,141 B2* | 6/2021 | Mezei | G21G 1/02 |
| 11,114,212 B2* | 9/2021 | Shao | G21C 1/30 |
| 2005/0135547 A1 | 6/2005 | Schulz | |
| 2007/0297555 A1* | 12/2007 | D'Auvergne | G21C 7/34 |
| | | | 376/218 |
| 2010/0067644 A1* | 3/2010 | D'Auvergne | G21C 13/073 |
| | | | 376/294 |
| 2016/0027534 A1* | 1/2016 | Ellwood Jr. | G21D 1/00 |
| | | | 376/151 |
| 2018/0075931 A1* | 3/2018 | Arafat | G21C 9/02 |
| 2021/0020323 A1* | 1/2021 | Shao | G21G 1/10 |

OTHER PUBLICATIONS

"Accelerator-driven Nuclear Energy". (2018). World Nuclear Association website. URL: Accelerator-driven Nuclear Energy | Accelerator Driven Systems | Transmutation—World Nuclear Association (world-nuclear.org) downloaded on Oct. 20, 2021. (Year: 2018).*

* cited by examiner

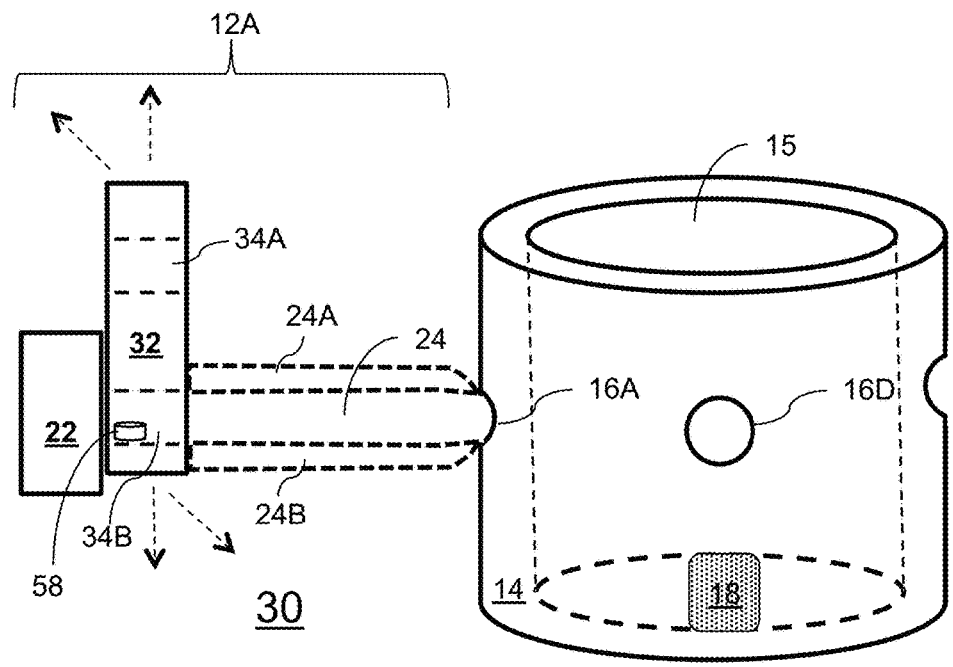
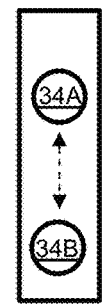
FIG. 3
FIG. 4
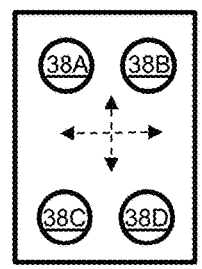
FIG. 4A
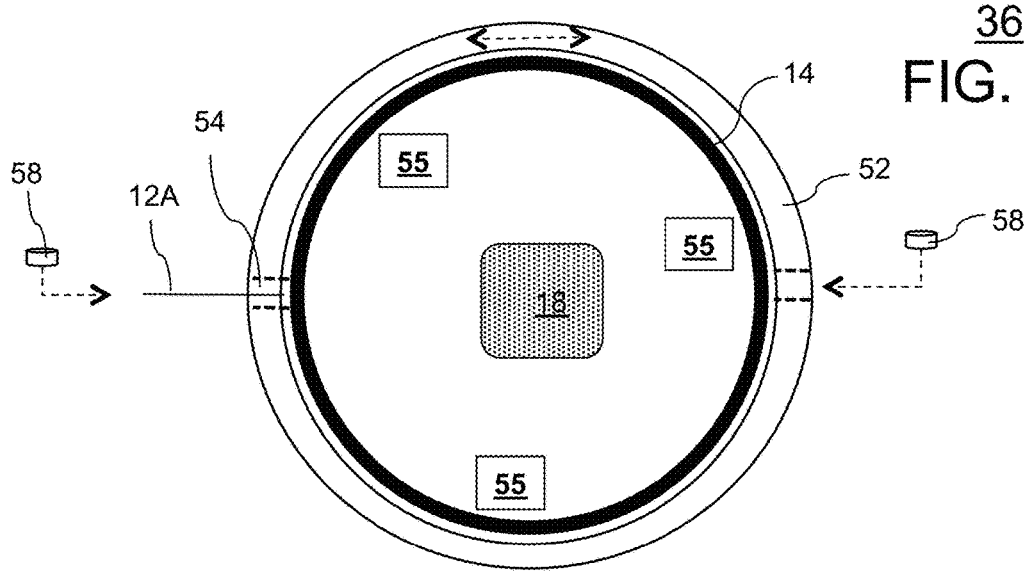
FIG. 5

NEUTRON EMITTER FOR A NUCLEAR-FUEL REACTOR

FIELD OF THE INVENTION

The present disclosure presents a breech-loading neutron gun, and more particularly a breech-loading gun that is a new improvement affording better control in regulating energy output with respect to nuclear powered sources.

BACKGROUND

Current methods to address some of the issues resolved by the current embodiments use fuel rods that do not provide the degree of control that can be provided by other methods and systems. Thus, existing systems and methods present unnecessary risks and fail to furnish the degree of control or efficiency or safety for nuclear generators whose energy release is controlled by just the use of control rods or other means. Further, current methods in certain embodiments use thorium with beds of salt in the containment unit which provide for release of nuclear energy by thorium or other nuclear material but which pose safety hazards because of the lack of control of the energy release. Likewise, other methods of energy generation use carbon-based energy sources that are not as environmentally friendly or economical.

SUMMARY

When used in conjunction with a containment unit for thorium or other nuclear materials, the breech-loading neutron gun reduces or eliminates the need for use of fuel rods and instead provides a method and system for controlling the release of nuclear energy that provides a high degree of control, thereby generating power in a safe, economical, efficient and environmentally friendly manner superior to nuclear power sources regulated by rods. Use of one or more breech-loaded neutron guns whose release of neutrons to activate the thorium or other radioactive material can be highly regulated and controlled. To provide a higher degree of control of the release of nuclear energy, the breech of the breech-loading neutron gun in some embodiments is constructed with chambers into which ceramic discs are placed which contain varying degrees of Americium or other nuclear material or no nuclear material are placed. Then the breech is placed between the butt of the gun and its barrel so that by either sliding the breech up and down, or side to side, or rotating the breech—which can be done electronically—the hole in the barrel can be aligned with a ceramic disc of the appropriate amount of Americium or other radioactive material or no radioactive material at all so as to control the release through the hole into the barrel of neutrons which then travel down the barrel which is connected to a hole in the containment unit with the result that the appropriate amount of neutrons can be released into the containment unit containing thorium or other radioactive material. In the case of discs containing no Americium or other radioactive material, the arrangement prevents the entry of neutrons into the containment unit. The neutron source can be chosen to produce the proper neutron density emitted from the end of the barrel of the gun. The output desired from the generator may determine the number of guns that can be used with the containment unit.

In some embodiments, the system can further include sensors for measuring heat level or other parameters inside the containment unit which is measured by such sensors. The sensors can generally measure heat, but other embodiments can include heat and other sensors or other sensors themselves that monitor radioactivity or magnetic field or other parameters. The sensors can be fixed or placed at appropriate intervals inside the containment unit so as to transmit the temperature or other parameter measurement to the software program for the regulation of the movement of the breech as appropriate to determining the level of neutron density needed to activate the thorium in the unit for release of power or, alternatively, even to employ ceramic discs that contain no Americium or other (less) radioactive material so as to ensure that the transmittal of neutrons to the containment unit has ceased for an appropriate time period so as to permit cooling of the thorium or other radioactive material in the containment unit. The containment unit also can be surrounded with multiple guns attached or aligned up to holes in the containment unit so that the ignition of the guns can be regulated to an even greater degree than by use of a single breech loaded neutron gun so as to lower or raise the rate of ignition relative to the amount of energy being released as measured by sensors and software which will receive data as to the heat level or other parameter inside the containment unit from the sensors placed at appropriate locations throughout the containment unit. The breech-loading neutron guns may be used with other nuclear materials and is not restricted to use solely with a thorium energy generator as described below. Most embodiments are contemplated with fissionable nuclear materials in mind in the containment unit, but other embodiments with modifications can be used with fusionable nuclear materials.

BRIEF DESCRIPTION OF THE DRAWINGS

FIG. 3 illustrates a side view with partial cut views of a nuclear power energy system including a neutron breech loaded gun and containment vessel containing nuclear material in accordance with the embodiments;

FIG. 4 illustrates an end view of a breech having multiple chambers in accordance with the embodiments;

FIG. 4A illustrates an end view of an alternative breech having multiple chambers in accordance with the embodiments;

FIG. 5 illustrates a top view of an alternative breech-loading gun in accordance with the embodiments;

DETAILED DESCRIPTION

Figure 1:
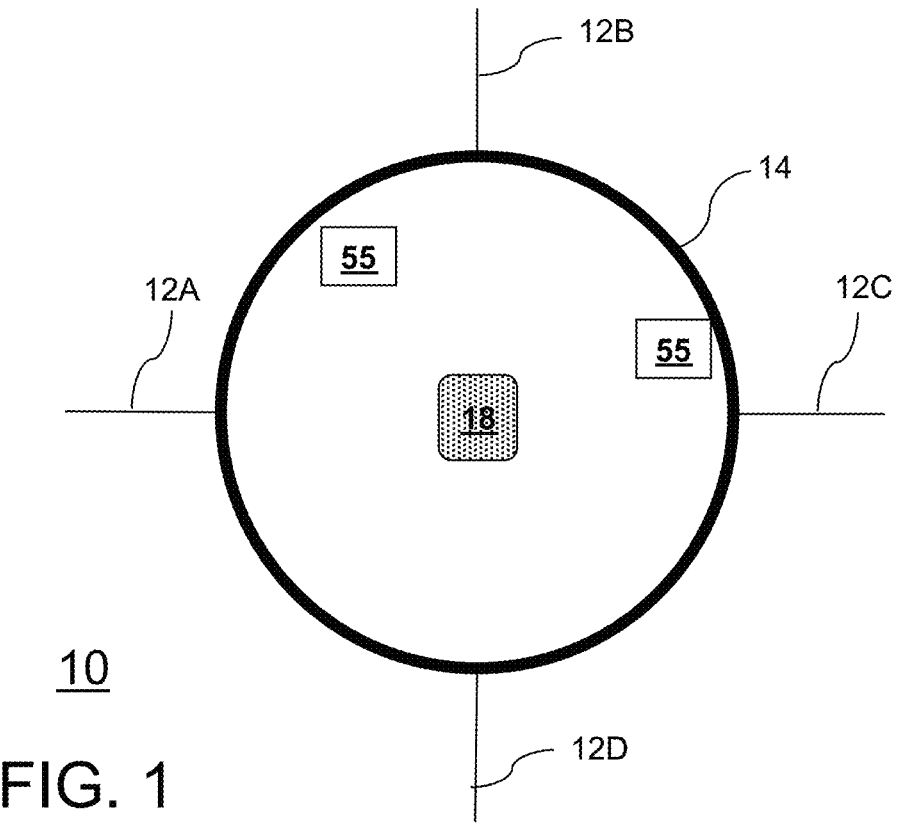
FIG. 1 illustrates block diagram top view of nuclear power energy system including at least one breech-loading neutron gun and containment vessel in accordance with the embodiments.
Figure 2:
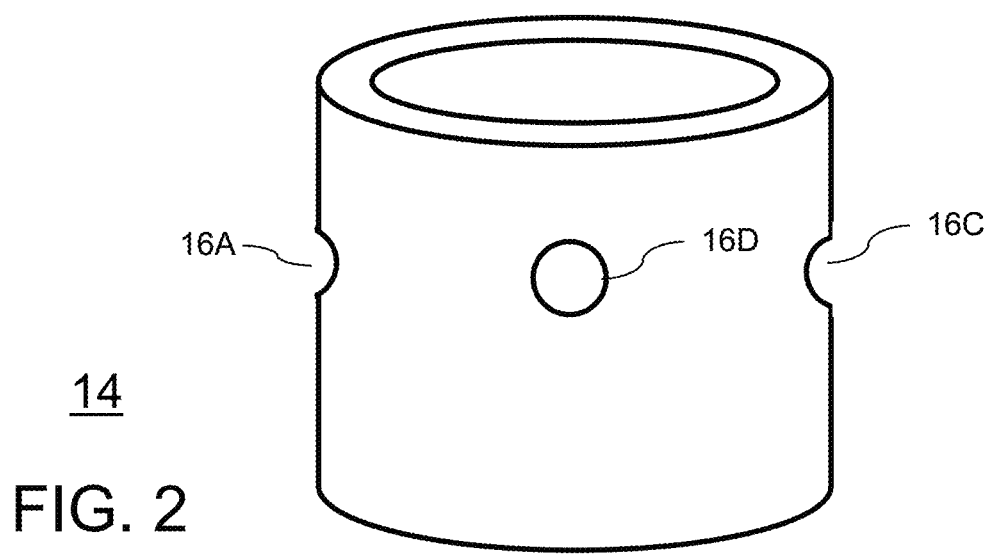
FIG. 2 illustrates a front perspective view of the containment vessel of FIG. 1 further showing access cavities of the containment vessel in accordance with the embodiments.

FIGS. 1-7 illustrate a breech-loading neutron gun controlled nuclear powered system 10 and its component parts which provide neutrons to stimulate the release of energy by thorium or other nuclear materials, but does so in a new and regulated fashion to better control the release of energy. A system 10 can include one or more breech-loading neutron guns 12A, 12B, 12C, 12D, etc. that have barrels 24 that align with a corresponding access cavity 16A, 16B, 16C, or 16D (see FIG. 2) of a containment vessel 14 containing nuclear or radioactive materials.

In some embodiments, a breech-loading neutron gun (12A-D) provides neutrons 61 (see FIG. 6) to stimulate the release of energy from nuclear materials 18 in a containment vessel 14 in a regulated fashion. The breech-loading neutron gun can include a chamber (34A or 34B) among a plurality of chambers located in a breech 32 where one or more of the plurality of chambers are configured and arranged to load with a neutron source 58, and a mechanism for controllably moving the breech 32 or the chamber (34A or 34B or 34A-D of FIG. 4A or 64A or 64B of FIG. 6) relative to an access cavity (16A-D) of the containment vessel 14 and exposing the nuclear materials 18 to neutrons from the chamber (34A-D or 64A-B) when the chamber containing the neutron source 58 aligns with the access cavity 16A-D. In some embodiments the breech 32 is located between a butt 22 of the gun (12A-D) and a barrel 24 of the gun 12A where the butt 22 covers the chamber (34A or B) of the breech 32 loaded with the neutron source 58 when the neutron source 58 aligns with the access cavity (16A-D) as illustrated in FIG. 3. In some embodiments, the one or more of the plurality of chambers 34 of the breech 32 is loaded with Americium, Californium-252, beryllium, polonium, radium, plutonium or any combination thereof or other appropriate neutron generating materials or no radioactive materials in certain cases.

In some embodiments, the mechanism for controllably moving the breech 32 is operatively coupled to one or more sensors 55 that measure one or more parameters among temperature, energy, or pressure (or other parameters such as radioactivity or magnetism) within the containment vessel 14 enabling control of the relative movement of the breech (32, 36, 52, 62, or 72) or to the containment vessel 14.

Figure 6:
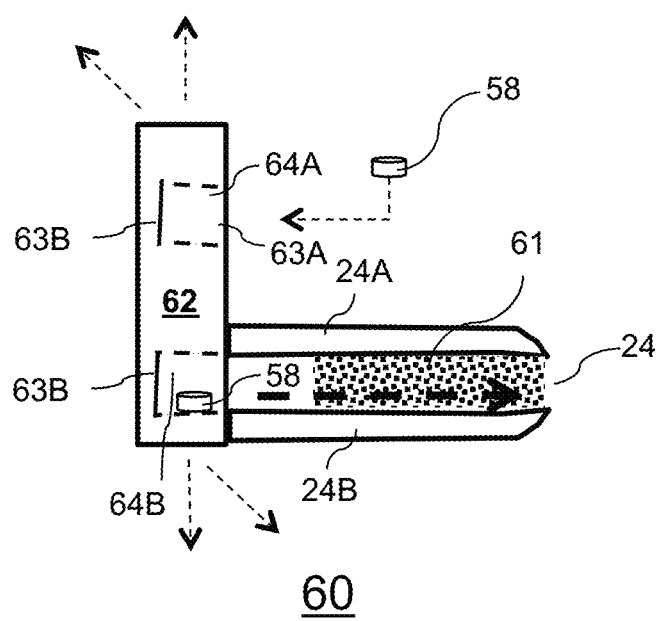
FIG. 6 illustrates a side view alternative breech loading gun in accordance with the embodiments.

In some embodiments as illustrated in the gun 60 of FIG. 6, the chambers 64A and 64B within the breech 62 have an open end 63A and a closed end 63B and each chamber of the plurality of chambers selectively align with a barrel 24 of the breech-loading neutron gun 60 and the barrel 24 aligns with the access cavity 16A of the containment vessel 14.

Figure 7:
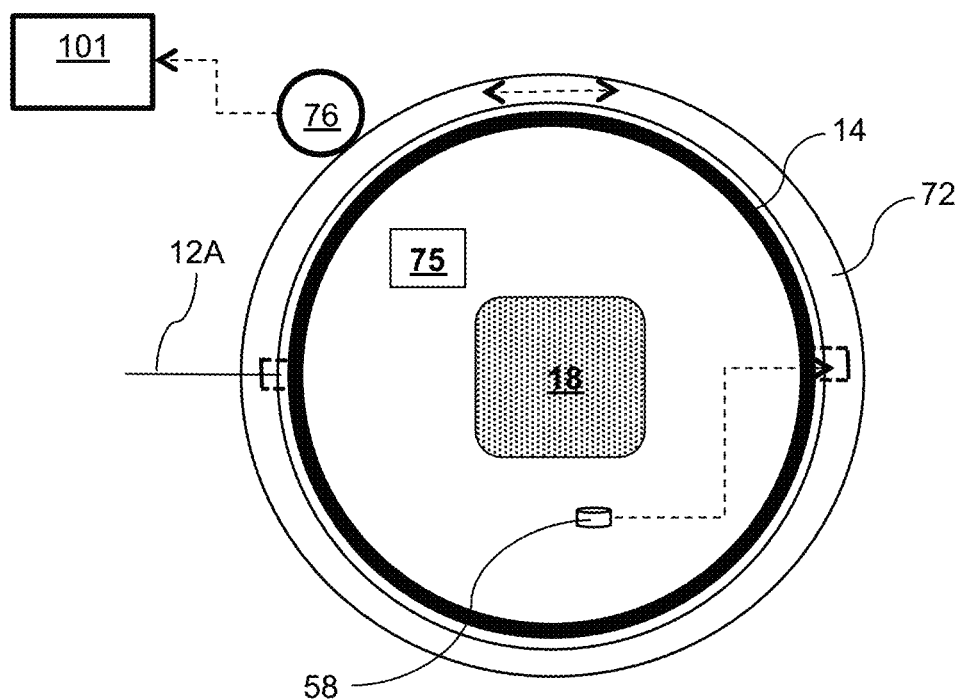
FIG. 7 is a top view of another alternative breech-loading gun in accordance with the embodiments.

In some embodiments as illustrated in FIGS. 5 and 7, the mechanism for controllably moving a breech 52 or 72 or their corresponding chamber relative to the containment vessel 14 includes a ring-shaped breech 52 or 72 that rotates relative to the containment vessel. In some embodiments, the breech 52 or 72 rotates around the containment vessel 14 or the containment vessel 14 rotates within a breech (52 or 72) configured in a shape of a ring.

In yet other embodiments, the breech (32 or 36) and corresponding chambers move up and down relative to the access cavity 16 of the containment vessel 14. In some embodiments, the breech 36 and corresponding chambers slide horizontally relative to the access cavity of the containment vessel.

In some embodiments, a breech-loading neutron gun provides neutrons to stimulate the release of energy from nuclear materials 18 via an access cavity 16 in a containment vessel 14 containing the nuclear materials 18 which can include, comprising a barrel 24 of a gun (12A) aligned and directly aimed at the access cavity (16A) of the containment vessel 14 and a breech 32 arranged and constructed to move relative to the barrel 24. The gun can further include multiple chambers located in the breech 32 (or 36), where one or more of the chambers among the multiple chambers is configured and arranged to hold a neutron source 58. The gun can further include a controlled breech movement device coupled to the breech 32 (or 36, 52, or 72), one or more sensors 55 for sensing one or more parameters within the containment vessel 14, one or more processors 101 operatively coupled to the one or more sensors 55 along with memory (107) operatively coupled to the one or more processors, and computer code stored in the memory where the computer code when executed by the one or more processors causes the controlled breech movement device to move the breech relative to the access cavity of the containment vessel enabling a controlled release of neutrons towards the nuclear materials within the containment vessel.

In some embodiments, the one or more sensors are located inside the containment vessel 14 and in conjunction with the computer code enables the one or more processors to control the sliding up or down or movement of the breech so as to increase, decrease or cease the release of neutrons into the containment vessel.

In some embodiments, a nuclear power generating system 10, 30, 50 or 70 using one or more breech-loading neutron guns (12A-D) provides neutrons to stimulate the release of energy from nuclear materials 18 via one or more access cavities (16A-D) in a containment vessel 14 containing the nuclear materials 18. Each breech-loading gun of the system can include a barrel 24 of the gun aligned and directly aimed at the one or more access cavities (16A-D) of the containment vessel 14, and a breech (32, 36, 52, or 72) arranged and constructed to move relative to the barrel 24, multiple chambers (34A, B, C, D, etc.) located in the breech 32 (or 36 or 52 or 72) where one or more of the chambers among the multiple chambers is configured and arranged to hold at least a neutron source 58. The system can further include a controlled breech movement device coupled to the breech (such as device 76 of FIG. 7), one or more sensors 55 (of FIG. 5) or sensor 75 (of FIG. 7) for sensing one or more parameters within the containment vessel, one or more processors (101, for example) operatively coupled to the one or more sensors, memory operatively coupled to the one or more processors, and computer code stored in the memory where the computer code when executed by the one or more processors causes the controlled breech movement device 76 to move the breech relative to the access cavity of the containment vessel enabling a controlled release of neutrons towards the nuclear materials within the containment vessel. The controlled breech movement device 76 can include any number of mechanical or electromechanical devices that moves the breech (32, 36, 52, or 72) relative to the containment vessel 14. For example, the device 76 can include ratcheting or rolling devices in contact with the breech causing the breech to move side to side, up and down, or rotate relative to the containment vessel. The sensors (55 or 75) can also be in (wireless or wired) communication with the processor 101 and/or device 76. The device 76 can also be in (wireless or wired) communication with the processor 101 (see FIGS. 7 and 8).

In some embodiments, the system includes two or more breech-loading neutron guns having corresponding barrels aligned with corresponding access cavities of the containment vessel and configured to release neutrons from the neutron source in a synchronized manner simultaneously or alternatively in a sequential manner. In some embodiments, the system releases neutrons from the neutron sources within the chamber of the breech.

Figure 6A:
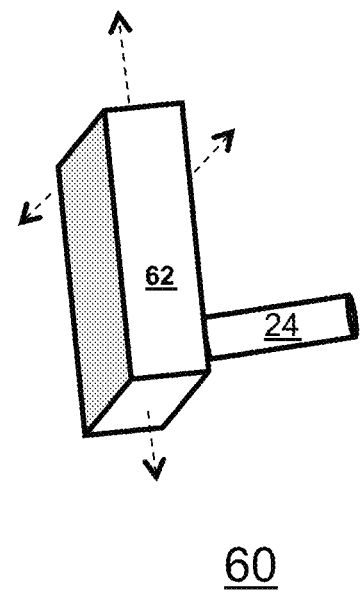
FIG. 6A is a perspective side view of the alternative breech loading gun of FIG. 6 in accordance with the embodiments.

With further reference to a nuclear powered system 30 of FIG. 3, by placing neutron sources 58 in the form of ceramic disks for example in the chambers 34A or 34B of the breech 32 as shown in FIG. 3 that contain more or less of Americium or other radioactive material which is the source of the neutrons—or by use of ceramic disks containing no Americium or other nuclear material—it is possible to align the appropriate disk 58 with a hole on the end of a barrel 24 (affixed at one end to the breech 32 and at an opposing end of the barrel 24 to a hole or access cavity or port 16A in the containment unit 14) to ensure that the level of neutrons released into the barrel 24 (from the neutron source 58) and subsequently in to the containment unit 14 is such as corresponds with the degree of release needed as can be determined by a software program that receives information from sensors 55 attached inside the containment unit for the purpose of measuring the level of heat (or other parameter) being generated in the containment unit 14. Thus, the breech 32—the chambers (34A and 34B) of which are loaded with these ceramic disks—can be rotated (as shown in FIG. 5 or 7) or made to slide up and down or side to side (as illustrated in FIGS. 3, 6, and 6A)—electronically or electromechanically in accordance with the information received by the software program from the sensors 55 inside the containment unit as to the level of heat (or other parameter) being generated.

Thus, it is possible to increase, decrease or temporarily cease the release of neutrons into the containment unit where the thorium or other radioactive material is located by aligning the neutron source or appropriate disk with the hole or chamber in the barrel 24 end of the gun that is attached to the breech portion 32 of the gun. In this fashion, the volume of the neutrons released into the containment chamber or unit 14 can be regulated with a high degree of control and the release of neutrons can even be temporarily terminated to ensure a high degree of control over the release of energy by the thorium or other radioactive material 18 residing inside a typically-constructed containment unit 14. The use of multiple chambers 34A and 34B in the breech 32—which can exceed the two chambers shown in FIGS. 3 and 4 depicting a single breech-loading neutron gun—along with the use of varying amounts of Americium or other radioactive material contained in the ceramic disks to be loaded into the chambers 34A and/or 34B of the breech 32—has the result that the volume of neutrons released from the neutron gun can be adjusted more quickly and more easily to increase or decrease or stop the neutron flow and the resultant energy flow from the thorium or other radioactive material 18 contained in the containment unit 14. FIG. 4 illustrates an end view of a breech 32 having multiple chambers 34A and 34B in accordance with the embodiments where the breech would generally be moved up and down relative to the access cavity 16 of the containment unit 14. As shown, the breech 32 can be moved up and down to align the chamber 34A or 34B with the access cavity 16. FIG. 4A illustrates an end view of an alternative breech 36 that can be used where the breech 36 (and its corresponding chambers 38A, 38B, 38C, and 38D (would generally be moved up and down or side to side relative to the access cavities of the containment unit 14.

FIG. 1 illustrates the use of several of the breech-loading neutron guns (12A-D) surrounding a containment unit 14 filled with thorium or other nuclear material 18. Each of the breech-loading neutron guns (12A-D) can be affixed to a corresponding hole, port or access cavity (16A-16D) in the containment unit 14 (see FIGS. 2 & 3), thereby providing an even higher degree of control of release of neutrons into the containment unit 14 and affording the ability to use multiple breech-loading neutron guns with larger containment units while still maintaining a high degree of control over the release of nuclear power from the thorium or other radioactive material 18 contained in these larger containment units. The multiple guns in FIG. 1 can each act in the same fashion as the single gun depicted in FIG. 3 except that the software programing can be used to orchestrate the ignition of the multiple guns in accordance with the information received from the sensors 55 inside the containment unit 14 as to the level of heat or other parameter being generated so as to ensure an even higher level of control in larger containment units over the increase, decrease or temporary cessation of the release of neutrons into the containment unit 14, thereby further ensuring an economical, environmentally friendly, more efficient—and importantly safer—manner for the generation of nuclear power than provided with other such nuclear power generator systems using control rods to control the release of energy. The multiple breech-loaded guns depicted in FIG. 1 can be arranged surrounding the containment vessel 14 in a variety of designs by affixing the multiple breech-loading neutron guns in a variety of locations on the sides and top of the containment unit. Further note that the guns can be fixed or configured to move relative to the containment vessel.

In some embodiments, the breech loading neutron gun can be used with thorium-based reactors such as a liquid fluoride thorium reactor (LFTR). LFTRs in theory have various advantages over uranium-fuelled reactors. LFTRs work at atmospheric pressure. In a light-water reactor, the type commonly deployed at the moment, the cooling water is under extremely high pressure and consequently light-water reactors need to be in steel pressure vessels and housed in concrete containment buildings. LFTR reactors don't need such level of containment and therefore have the potential to be safer and cheaper. In some embodiments, the breech-loading neutron gun will have two chambers while in other embodiments, the breech-loading neutron gun will have more than two chambers, depending on the desired output of neutrons and energy.

In some embodiments, the chamber and breech of the breech-loading neutron gun can be configured in a variety of configurations including the utilization of a revolving breech chamber or a sliding breech chamber which are moved electronically up and down or around, respectively, depending on whether a sliding or revolving breech chamber is employed.

In some embodiments, multiple breech-loading neutron guns can be affixed to holes located in various locations on sides and top of the containment unit with the ignition of the guns regulated by software receiving data as to the heat being generated inside the containment unit from sensors located in various locations inside the containment unit so that the amount of neutrons being released into the containment unit can be increased, decreased or ceased relative to the amount of energy release needed or relative to the need for cooling of thorium or other radioactive material 18 inside the containment unit 14, thereby ensuring a precise control of the degree of energy release by means of use of multiple guns either igniting simultaneously or sequentially as called for by the measured degree of energy release as monitored and controlled by software which is programed to control the rate of ignition based on the release of energy occurring inside the containment unit as measured by the sensors.

In some embodiments, the breech-loading neutron gun will have larger chambers and larger ceramic disks, as needed, depending on the neutron-emitting source material used which may be Americium or some other radioactive material and the amount of the desired output of neutrons and energy.

In some embodiments, the containment unit will be used with a single breech-loading neutron gun while in other embodiments, the containment unit will be surrounded by multiple breech-loading neutron guns, depending on the desired output of neutrons and energy and/or on whether the energy generator is intended to be mobile or stationary and/or depending upon the desired size of the energy generator. Again, in such embodiments, multiple the breech-loading neutron guns can be affixed to holes in the containment unit around the sides and top of the containment unit with the multiple guns made to ignite as appropriate based on the data received by the software program from the sensors placed in various locations inside the containment vessel so as to lower or raise the rate of ignition relative to the amount of energy release or cease the release of neutrons to ensure cooling of the thorium or radiative material, as needed for safety.

In some embodiments, the containment unit will contain thorium while, in other embodiments, the containment unit will contain other types of nuclear material as the energy source.

In some embodiments, the containment unit will be relatively small for uses such as for the powering of vehicles or residential use while, in other embodiments, the containment unit will be larger for use in commercial capacities for operation of factories and other such facilities.

In some embodiments, the disks used with the chambers of the breech-loading neutron gun will contain Americium while in other embodiments the disks will contain other types of radioactive material. Again, not all disks will contain radioactive material.

In some embodiments, the system can be a client device having one or more computer storage (non-transitory) mediums containing computer instructions enabling safe and efficient control of nuclear power generation via control of neutrons, and one or more processors operationally coupled to the one or more computer storage mediums where the one or more processors perform the operations described above.

In some embodiments, the system can further include a computer-storage media coupled to a processor (or processors) and computer-executable instructions embodied in the computer-storage media that, when executed by one or more computing devices, perform a method that perform any number of steps as may be described herein.

Various embodiments of the present disclosure can be implemented on an information processing system. The information processing system is capable of implementing and/or performing any of the functionality set forth above. Any suitably configured processing system can be used as the information processing system in embodiments of the present disclosure. The information processing system is operational with numerous other general purpose or special purpose computing system environments, networks, or configurations. Examples of well-known computing systems, environments, and/or configurations that may be suitable for use with the information processing system include, but are not limited to, personal computer systems, server computer systems, thin clients, hand-held or laptop devices, notebook computing devices, multiprocessor systems, mobile devices, microprocessor-based systems, set top boxes, programmable consumer electronics, network PCs, minicomputer systems, mainframe computer systems, Internet-enabled television, and distributed cloud computing environments that include any of the above systems or devices, and the like. As noted previously, the data processing can be any number of data processing techniques suited for the controlled generation of power via controlled release of neutrons.

For example, a user with a mobile device may be in communication with a server configured to implement the system using the aforementioned elements, according to an embodiment of the present disclosure. The mobile device can be, for example, a multi-modal wireless communication device, such as a "smart" phone, configured to store and execute mobile device applications ("apps"). Such a wireless communication device communicates with a wireless voice or data network using suitable wireless communications protocols assuming the networks have the appropriate bandwidth to present data or real time images. Alternatively, the display system can be a computing and monitoring system with or without wireless communications as the case may be.

The system may include, inter alia, various hardware components such as processing circuitry executing modules that may be described in the general context of computer system-executable instructions, such as program modules, being executed by the system. Generally, program modules can include routines, programs, objects, components, logic, data structures, and so on that perform particular tasks or implement particular abstract data types. The modules may be practiced in various computing environments such as conventional and distributed cloud computing environments where tasks are performed by remote processing devices that are linked through a communications network. In a distributed cloud computing environment, program modules may be located in both local and remote computer system storage media including memory storage devices. Program modules generally carry out the functions and/or methodologies of embodiments of the present disclosure, as described above.

In some embodiments, a system includes at least one memory and at least one or more processor of a computer system communicatively coupled to the at least one memory. The at least one processor can be configured to perform a method including methods described above.

According to yet another embodiment of the present disclosure, a computer readable storage medium comprises computer instructions which, responsive to being executed by one or more processors, cause the one or more processors to perform operations as described in the methods or systems above or elsewhere herein.

Figure 8:
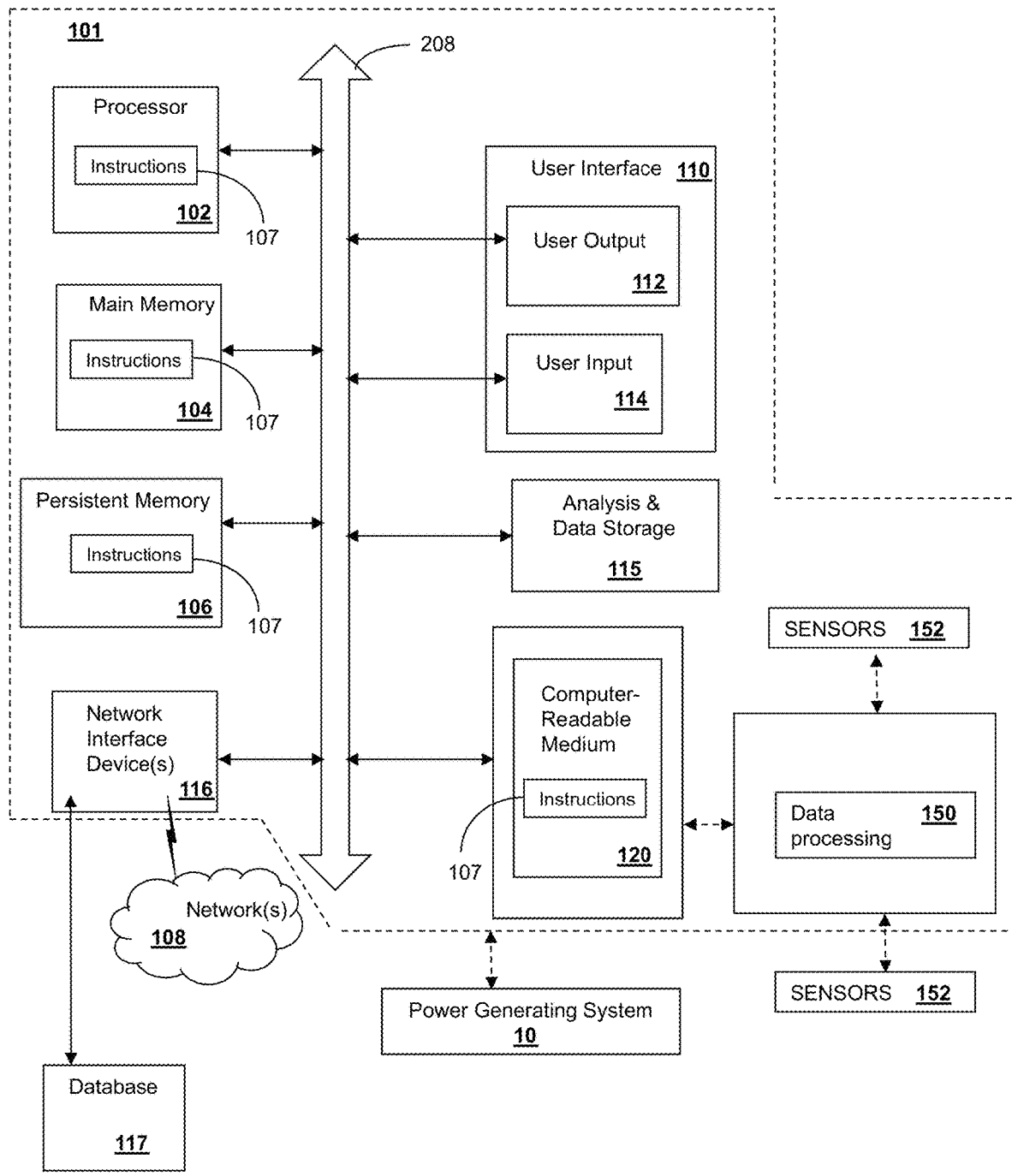
FIG. 8 is a system diagram of a nuclear power generating system using the breech-loading neutron gun in accordance with the embodiments.

As shown in FIG. 8, an information processing system 101 of a system 100 can be communicatively coupled with the data processing module 150 and a group of client or other devices, or coupled to a presentation device for display at any location at a terminal or server location. According to this example, at least one processor 102, responsive to executing instructions 107, performs operations to communicate with the processing module 150 via a bus architecture 208, as shown. The at least one processor 102 is communicatively coupled with main memory 104, persistent memory 106, and a computer readable medium 120. The processor 102 is communicatively coupled with an Analysis & Data Storage 115 that, according to various implementations, can maintain stored information used by, for example, the data processing module 150 and more generally used by the information processing system 100. The data processing module 150 can be coupled to one or more sensors 152 as needed. Such sensors can be thermostats, orientation sensors, rotation sensors, pressure sensors, location sensors, motion sensors, barcode scanners, fingerprint readers, proximity sensors, microphones, cameras, video cameras, location sensors, motion detectors, biometric reading devices (e.g., iris scanners, facial recognition scanners, voice detection devices) and other devices as contemplated herein. Some sensors 152 can be part of the processor 101 itself or operatively coupled to the sensors 152. Optionally, this stored information can be received from the client or other devices. For example, this stored information can be received periodically from the client devices and updated or processed over time in the Analysis & Data Storage 115. Additionally, according to another example, a history log can be maintained or stored in the Analysis & Data Storage 115 of the information processed over time. The data processing module 150, and the information processing system 100, can use the information from the history log such as in the analysis process and in making decisions related to a particular user's access or for logging electronically tagged objects according to a database of best practices for a particular procedure or procedures.

The computer readable medium 120, according to the present example, can be communicatively coupled with a reader/writer device (not shown) that is communicatively coupled via the bus architecture 208 with the at least one processor 102. The instructions 107, which can include instructions, configuration parameters, and data, may be stored in the computer readable medium 120, the main memory 104, the persistent memory 106, and in the processor's internal memory such as cache memory and registers, as shown.

The information processing system 100 includes a user interface (or interfaces) 110 that comprises a user output interface 112 and user input interface 114. Examples of elements of the user output interface 112 can include a display, a speaker, one or more indicator lights, one or more transducers that generate audible indicators, and a haptic signal generator or any of the interfaces illustrated or discussed with respect to the figures or elsewhere in the application. Examples of elements of the user input interface 114 can include a keyboard, a keypad, a mouse, a track pad, a touch screen, a touch pad, a microphone that receives audio signals, a camera, a video camera, a CT-Scanner, or any other scanner that scans images. Some user inputs can be sensors or vice-versa. The received audio signals or scanned images, for example, can be converted to electronic digital representations and stored in memory, and optionally can be used with corresponding voice or image recognition software executed by the processor 102 to receive user input data and commands, or to receive test data for example. The voice recognition software can be used to enter or check off items on a checklist and further provide data or text entry allowing the practitioner to enter notes as needed.

A network interface device 116 is communicatively coupled with the at least one processor 102 and provides a communication interface for the information processing system 100 to communicate via one or more networks 108. The networks 108 can include wired and wireless networks, and can be any of local area networks, wide area networks, or a combination of such networks. For example, wide area networks including the internet and the web can intercommunicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 116 can provide a communication interface for the information processing system 100 to access the at least one database 117 according to various embodiments of the disclosure.

The instructions 107, according to the present example, can include instructions for monitoring, instructions for analyzing, instructions for retrieving and sending information and related configuration parameters and data. It should be noted that any portion of the instructions 107 can be stored in a centralized information processing system or can be stored in a distributed information processing system, i.e., with portions of the system distributed and communicatively coupled together over one or more communication links or networks.

FIGS. 1-7 illustrate examples of systems, methods or process flows, according to various embodiments of the present disclosure, which can operate in conjunction with the information processing system 100 of FIG. 8.

In interpreting the present disclosure and the claims, references of the form "A and/or B" encompass any and every combination and subcombination of elements A and B, namely, any or all of the following: (i.) A, (ii.) B, (iii.) A or B, and (iv.) A and B. References of the form "A, B, and/or C" likewise encompass any and every combination and subcombination of elements A, B and C). Where the present disclosure or any of the claims may recite "a" or "a first" item or the equivalent thereof, such disclosure includes one or more such items and does not require or exclude two or more such items. Numerical or ordinal terms such as "first", "second", "third" etc. when used to refer to items are used solely to identify the items, and do not require or limit the number of such items elements and do not indicate, require or limit a particular position or order of such items unless expressly and clearly stated otherwise.

Descriptions made with reference to "embodiment", "embodiments", "some embodiments", "an embodiment", "preferred embodiment". "other embodiments" "alternative embodiments", "various embodiments" or the like mean that the description is applicable to at least one embodiment of the invention but not necessarily all embodiments. The terms "comprising," "including," "having," and the like, as used with respect to one or more embodiments, are synonymous. In some cases features, items steps or other subject matter are described herein as being optional or using terms such as "optional" or "optionally". However, lack use of such terms in connection with the description of any other features, items steps or other subject matter does not in any way mean or imply that such other features, items steps or other subject matter are required or are not optional.

As an aid to understanding, various actions, operations or steps may sometimes be presented herein or described herein in sequence. However, the order of description or written presentation herein is not to be construed to mean or imply that such must necessarily occur in a corresponding order or sequence unless otherwise expressly and clearly stated or logically essential. Some actions, operations or steps may permissibly be performed in an order or sequence other than the order of their description or written presentation herein unless otherwise expressly and clearly stated or logically essential. Unless otherwise expressly and clearly stated or logically essential, actions, operations or steps described herein may be combined or divided. Unless otherwise expressly and clearly stated or logically essential, any description herein of any one or more actions, operations or steps does not preclude any one or more other preceding, succeeding and/or intervening actions, operations or steps irrespective of whether or not such preceding, succeeding and/or intervening actions, operations or steps are described or disclosed herein.

Unless otherwise expressly and clearly stated or logically essential, any illustration, description, or reference herein of any one or more items, structures or elements being "connected to", "coupled to", "joined to", "joined with", "attached to", "mounted to", "mounted in" or "secured to" any one or more other specified items, structures or elements shall not be construed to preclude such connection, coupling, joint, attachment, mounting or securement being either made indirectly, by way of one or more other specified or unspecified items structures or elements, or being made directly.

Unless otherwise expressly and clearly stated or logically essential, any illustration, description, or reference herein of any one or more items, structures or elements "adjoining", any one or more other specified items, structures or elements, shall be construed to permit that such may adjoin either direct or indirectly. The term "adjoining" permits, but does not require, preclude the presence of items, structures or elements interposed between those describes as adjoining. Unless otherwise expressly and clearly stated or logically essential, any illustration, description, or reference herein to any one or more items, structures or elements being "beneath", "below", "above", "behind", "in front of", "between", "under", "over", "in", "within", "outside", "inside" any one or more other specified items, structures or elements and/or any other prepositions or prepositional phrases shall construed in a manner which permits, but does not require, contact or immediacy and any and all other prepositions and/or prepositional phrases shall be construed in that same manner.

As used herein, the term "material" encompasses, without limitation, unblended materials having a single constituent, blended materials having two or more constituents, composite materials, homogeneous materials and non-homogeneous materials.

While the invention has been described with reference to various preferred embodiments, it will be understood by those skilled in the art that various changes may be made and equivalents substituted for elements thereof without departing from the scope of the invention and that modifications may be made to adapt to a particular situation or application of the invention without departing from the scope of the invention. The invention is not limited to the particular embodiments disclosed. Rather, the invention covers all embodiments which are within the scope of the claims, either literally or under the Doctrine of Equivalents.

What is claimed is:

1. A breech-loading neutron emitter providing neutrons to stimulate the release of energy from nuclear materials in a containment vessel in a regulated fashion, comprising:
   a chamber among a plurality of chambers located in a breech, wherein one or more of the plurality of chambers are configured and arranged to load with a neutron source;
   a mechanism for controllably moving the breech or the chamber relative to an access cavity of the containment vessel and exposing the nuclear materials to neutrons from the chamber when the chamber containing the neutron source aligns with the access cavity; and
   one or more sensors operatively coupled to the mechanism for controllably moving the breech, wherein the one or more sensors measure one or more parameters among temperature, energy, or pressure within the containment vessel enabling control of the relative movement of the breech to the containment vessel.

2. The breech-loading neutron emitter of claim 1, wherein the breech is located between a butt of the emitter and a barrel of the gun emitter.

3. The breech-loading neutron gun emitter of claim 1, wherein the breech is arranged between a butt of the emitter and a barrel of the emitter and wherein the butt covers the chamber of the breech loaded with the neutron source when the neutron source aligns with the access cavity.

4. The breech-loading neutron emitter of claim 1, wherein one or more of the plurality of chambers of the breech is loaded with Americium, Californium-252, beryllium, polonium, radium, plutonium or any combination thereof.

5. The breech-loading neutron emitter of claim 1, wherein the one or more plurality of chambers of the breech is loaded with radioactive materials or no radioactive materials.

6. The breech-loading neutron emitter of claim 1, wherein the breech is located between a butt of the gun and a barrel of the emitter and wherein the butt is located on an opposite side of the barrel and wherein the barrel aligns with the access cavity of the containment vessel.

7. The breech-loading neutron emitter of claim 1, wherein the mechanism for controllably moving the breech is operatively coupled to one or more sensors that measure one or more parameters among temperature, energy, pressure, radioactivity, or magnetism within the containment vessel enabling control of the relative movement of the breech to the containment vessel.

8. The breech-loading neutron emitter of claim 1, wherein the chambers within the breech have an open end and a closed end and each chamber of the plurality of chambers selectively align with a barrel of the breech-loading neutron emitter and the barrel of the breech-loading neutron emitter aligns with the access cavity of the containment vessel.

9. The breech-loading emitter of claim 1, wherein the mechanism for controllably moving the breech or the chamber relative to the containment vessel comprises a ring-shaped breech that rotates relative to the containment vessel.

10. The breech-loading emitter of claim 9, wherein the breech rotates around the containment vessel or the containment vessel rotates within a breech configured in a shape of a ring.

11. The breech-loading emitter of claim 1, wherein the breech and corresponding chambers move up and down relative to the access cavity of the containment vessel.

12. The breech-loading emitter of claim 1, wherein the breech and corresponding chambers slide horizontally relative to the access cavity of the containment vessel.

13. A breech-loading neutron emitter providing neutrons to stimulate the release of energy from nuclear materials via an access cavity in a containment vessel containing the nuclear materials, comprising:
   a barrel of the emitter aligned and directly aimed at the access cavity of the containment vessel;
   a breech arranged and constructed to move relative to the barrel;
   multiple chambers located in the breech, wherein one or more of the chambers among the multiple chambers is configured and arranged to hold a neutron source;
   a controlled breech movement device coupled to the breech;
   one or more sensors for sensing one or more parameters within the containment vessel, wherein the one or more sensors measure one or more parameters among temperature, energy, or pressure within the containment vessel enabling control of the relative movement of the breech to the containment vessel;

one or more processors operatively coupled to the one or more sensors;

memory operatively coupled to the one or more processors; and computer code stored in the memory, wherein the computer code when executed by the one or more processors causes the controlled breech movement device to move the breech relative to the access cavity of the containment vessel enabling a controlled release of neutrons towards the nuclear materials within the containment vessel.

14. The breech-loading emitter of claim 13, further comprising a butt of the emitter aligned with the access cavity of the containment vessel and wherein the breech is arranged and constructed to move between the butt and the barrel.

15. The breech-loading emitter of claim 13, wherein the one or more sensors are located inside the containment vessel and in conjunction with the computer code enables the one or more processors to control the sliding up or down or movement of the breech so as to increase, decrease or cease the release of neutrons into the containment vessel.

16. The breech-loading neutron emitter of claim 13, wherein the one or more chambers of the multiple chambers of the breech is loaded with radioactive materials or no radioactive materials to control the release of neutrons towards the containment vessel.

17. A nuclear power generating system using one or more breech-loading neutron emitters providing neutrons to stimulate the release of energy from nuclear materials via one or more access cavities in a containment vessel containing the nuclear materials, wherein each breech-loading emitter of the system comprises:

a barrel of the emitter aligned and directly aimed at the one or more access cavities of the containment vessel;

a breech arranged and constructed to move relative to the barrel;

multiple chambers located in the breech, wherein one or more of the chambers among the multiple chambers is configured and arranged to hold at least a neutron source;

a controlled breech movement device coupled to the breech;

one or more sensors for sensing one or more parameters within the containment vessel, wherein the one or more sensors measure one or more parameters among temperature, energy, or pressure within the containment vessel enabling control of the relative movement of the breech to the containment vessel;

one or more processors operatively coupled to the one or more sensors;

memory operatively coupled to the one or more processors; and computer code stored in the memory, wherein the computer code when executed by the one or more processors causes the controlled breech movement device to move the breech relative to the access cavity of the containment vessel enabling a controlled release of neutrons towards the nuclear materials within the containment vessel.

18. The nuclear power generating system of claim 17, wherein the system comprises two or more breech-loading neutron emitters having corresponding barrels aligned with corresponding access cavities of the containment vessel and configured to release neutrons from the neutron source in a synchronized manner simultaneously.

19. The nuclear power generating system of claim 17, wherein the system comprises two or more breech-loading neutron emitters having corresponding barrels aligned with corresponding access cavities of the containment vessel and configured to release neutrons from the neutron source through the corresponding barrels in a sequential manner.

20. The nuclear power generating system of claim 17, wherein the system releases neutrons from the neutron sources within the chamber of the breech.

* * * * *